Sept. 8, 1959 W. GROHMANN ET AL 2,903,519
AUTOMATIC P.B.X SYSTEM PROVIDING DIFFERENT CLASSES OF SERVICE
Filed March 1, 1955
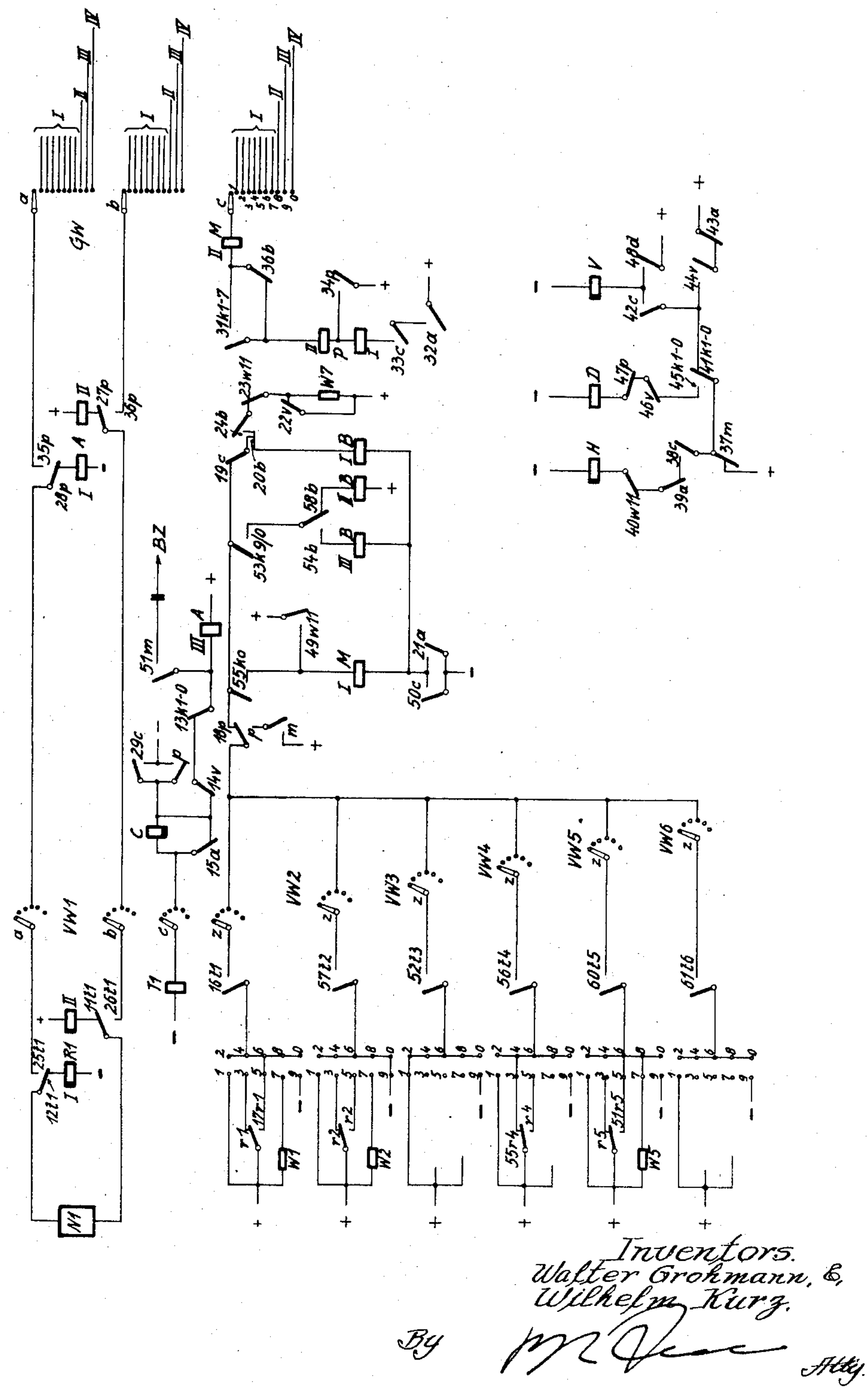
Inventors.
Walter Grohmann, &
Wilhelm Kurz.
By [signature] Atty.

Patented Sept. 8, 1959

2,903,519

AUTOMATIC P.B.X SYSTEM PROVIDING DIFFERENT CLASSES OF SERVICE

Walter Grohmann and Wilhelm Kurz, Munich, Germany, assignors to Siemens & Halske Aktiengesellschaft, Munich, Germany, a corporation of Germany Application March 1, 1955, Serial No. 491,387

17 Claims. (Cl. 179—18)

This invention is concerned with an automatic private branch exchange (referred to as P.B.X) telephone system providing for the extension of calls involving different classes of service and having a circuit arrangement for controlling the building up of calls from extension stations with different call privileges.

Arrangements are known for marking different call authorization or privileges by using the same authorization potential and connecting it to a marker conductor over resistors having different resistances.

Other known arrangements use for this purpose various potentials for marking or characterizing different service authorization.

The object of the invention is to provide an arrangement utilizing simple means for evaluating or interpreting a plurality of different authorization criteria without resorting to the use of different resistors or battery potentials or both.

This object is in part realized by causing an authorization potential which is identical for several P.B.X extension stations of different call authorization to control after seizure of a selector switch, at different switching instances, the circuits of different switching means which prevent the setting or operation of switches in various traffic directions. The selector switch may be a group selector accessible to preselectors in known manner.

The invention, an embodiment of which will now be described more in detail with reference to the accompanying diagrammatic drawing thus makes it possible to evaluate or interpret by the use of the same potential a plurality of authorization criteria.

In accordance with the illustrated embodiment, three different authorization criteria are obtained depending respectively on continuous or temporary connection of a positive (+) potential directly upon seizure of a group selector by a preselector and on connection of such potential at the instant when the group selector is ready to receive the dialed impulse series which identifies the desired class of service.

A group selector GW diagrammatically indicated in the drawing is adapted to extend calls involving four different classes of service I–IV. The trunk lines I (vertical levels 1 to 7 of the group selector) may for example be reserved for calls to local P.B.X extension stations, so-called house calls; the trunks II, III and IV (vertical levels 8, 9 and 10 of the group selector) may serve for calls to other exchanges.

A first group of local P.B.X extension stations may be authorized to engage only in house calls over the trunks I. If such an extension station attempts to call over either one of the trunks II, III or IV, the completion of the corresponding call must be prevented. The authorization criterion to be used in such a case is obtained by temporarily connecting positive potential directly upon seizure of the group selector by the preselector of the calling station.

A second group of local P.B.X extension stations may be authorized to call only over the trunks I and III, and calls over the trunks II and IV must accordingly be prevented. The service or authorization criterion for a station in such group is obtanied by continuous connection of positive potential to the authorization marker conductor of the seized group selector.

A third group of local P.B.X extension stations may be authorized to call only over the trunks I, II and III and calls over the trunks IV must accordingly be prevented. The authorization criterion is in such a case obtained by connecting positive potential to the marker conductor of the seized group selector switch at the instant when such group selector is ready to receive the dial impulse series identifying the desired traffic direction.

It will be seen therefore that the same positive potential is for all the three above-mentioned service groups connected and evaluated at different switching instances.

There may be in the illustrated embodiment a fourth group of local P.B.X extension stations authorized to call only over the trunks I and II. Calls over the trunks III and IV must accordingly be prevented. The authorization criterion is in such a case negative (−) potential which is connected to the authorization marker conductor of the seized group selector switch.

A fifth group of stations may be authorized to call only over the trunks I, III and IV. Calls over the trunk II are in such cases prevented by temporary direct connection of positive potential to the marker conductor of the seized group selector switch upon seizure thereof with subsequent connection to the marker conductor of positive potential over a resistor.

Local P.B.X extension stations with unlimited call privileges, that is, stations authorized to call over all trunks I–IV are marked by absence of potential on the marker conductor of the group selector involved in a call.

The various above-indicated call possibilities will now be discussed more in detail.

1. *Calls from stations authorized to extend calls only by way of trunks I*

It shall be assumed that stations like the station N1 shown in the drawing are authorized to extend calls only by way of the trunks I. For such a station, there is provided a jumper connection between the terminals 5/6 so that positive (+) potential will be connected to the wiper *z* of the preselector VW1 over contact **17*r*1 of line relay R1 and contact 16*t*1** of cut-off relay T1, at a time when the cut-off relay T1 becomes energized while the line relay R1 is still in operated position.

When the handset is lifted at the station N1, the line relay R1 will be energized over its windings I and II in a circuit:

(1) From +, winding II of R1, contact **11*r*1, line loop over station N1, contact 12*t*1**, winding I of R1 to −.

The line relay R1 upon energizing causes in known manner actuation of the preselector VW1 to connect its wipers *a, b, c* with an idle group selector switch assumed to be the group selector GW. Over the test or private wiper *c* of the preselector VW1 there will be completed a circuit for the energization of relay A (winding III) and the cut-off relay T1, extending over the contact **13*k*1–0** which is a vertical off-normal contact of the group selector GW and open in the vertical positions 1–0 thereof, the circuit extending:

(2) From +, winding III of relay A, **13*k*1–0, 14*v*, 15*a***, wiper *c* of preselector VW1, winding of relay T1 to −.

Relays A and T1 accordingly energize. At its contact **15*a*, relay A removes the shunt around the winding of relay C and the latter energizes with some delay. The cut-off relay T1 of the line circuit of the calling station closes its contact 16*t*1, thereby switching the terminals 5/6** through to the associated preselector wiper *z*. Now, before the relay C is in operated position and while the line relay R1 is still actuated, a circuit will be completed for the energization of relay B of the group selector:

(3) From +, 17*r*1, terminals 5/6, 16*t*1, wiper *z*, 18*p*, 19*c*, 20*b*, winding I of relay B, 21*a* to —.

Upon energizing relay B closes a holding circuit for itself at its contact 24*b* extending over the rotary off-normal contact 23*w*11 of the group selector:

(4) From +, 22*v*, 23*w*11, 24*b*, winding I of B, 21*a* to —.

The original energizing circuit "3" for winding I of relay B is interrupted at contact 20*b*.

The line relay R1 deenergizes upon opening of the contacts 11*t*1/12*t*1, responsive to actuation of the cut-off relay T1, and the contact 17*r*1 is accordingly opened, thus disconnecting the positive potential from wiper *z* of the preselector VW1 and consequently from the marker conductor of the group selector. At contacts 25*t*1/26*t*1, relay T1 extends the line conductors through to line relay A (windings I and II) of the seized group selector by way of the preselector wipers *a* and *b*. The relay A which had been energized in the circuit traced under "2" is now held energized over the line loop in the circuit:

(5) From +, winding II of A, 27*p*, preselector wiper *b*, 26*t*1, station N1, 25*t*1, wiper *a* of preselector VW1, 28*p*, winding I of A to —.

The winding I of the relay B is at contact 19*c*, upon energization of the relay C, disconnected from the authorization marker conductor which extends over the normal contact 18*p* to bank contacts of the preselectors VW1 . . . VW6 as shown. The relays C and T1 remain energized in a holding circuit:

(6) From +, 29*c*, winding of C, wiper *c* of the preselector VW1, winding of T1 to —.

Relay V (bottom right of drawing) becomes energized over contact 42*c* of the relay C and a vertical off-normal contact 41*k*1–0 which is now at normal but actuated in the vertical positions 1–0 of the group selector, the corresponding circuit extending:

(7) From +, 37*m*, 41*k*1–0, 42*c*, winding of V to —.

Relay B, upon energizing, has opened contact 36*b* in the test circuit of the seized group selector GW which extends over the private wiper *c* thereof. Such test circuit accordingly depends on the vertical off-normal contact 31*k*1–7; the latter contact is closed in the vertical levels 1–7 of the group selector upon vertical setting of the wipers thereof responsive to receipt of any of the dial digits 1–7 from the calling station. The bank contacts in these levels are connected with the trunk lines I, that is, trunk lines for extending house calls only.

The line or impulse relay A responds in known manner to the dial pulses transmitted from the calling station N1. Upon transmission of the first impulse, the vertical magnet H of the group selector GW is correspondingly energized in circuit:

(8) From +, 37*m*, 38*c*, 39*a*, rotary off-normal contact 40*w*11, vertical magnet H to —.

Contact 41*k*1–10, being a vertical off-normal contact, is opened responsive to the first vertical step of the wipers of the group selector, interrupting the original energizing circuit of the relay V. Such relay remains, however, energized during the receipt of the impulse series, in a circuit:

(9) From +, 43*a*, 44*v*, 42*c*, winding of V to —.

Upon conclusion of the impulse series, relay V restores, switching in the rotary stepping magnet D in the circuit:

(10) From +, 37*m*, vertical off-normal contact in position 45*k*1–10, 46*v*, 47*p*, rotary stepping magnet D to —.

The rotary stepping magnet closes its contact 48*d*, completing a circuit for reenergizing relay V. Relay V opens its contact 46*v*, thereby interrupting the circuit "10" of the rotary stepping magnet D. The rotary stepping magnet D and relay V cooperate in interplay causing the rotary stepping of the wipers of the group selector GW in hunting operation until an idle trunk is found in the vertical level to which the wipers had been lifted by the vertical stepping magnet H responsive to the dial impulse series received.

If the calling party has transmitted one of the dial digits 1–7, the hunting operation of the group selector GW is effected in the corresponding (authorized) level, and when an idle trunk is found in such level, there will be completed a test circuit:

(11) From +, 32*a*, 33*c*, windings I and II of relay P, vertical off-normal contact 31k1–7, winding II of relay M, wiper *c* of the group selector GW to —potential on the corresponding conductor of the seized trunk which terminates in the next succesive switch.

Upon energizing, relay P closes its contact 34*p*, thus shunting its winding I and thereby placing a busy potential on the private conductor of the seized trunk. At contacts 28*p*/27*p*, relay P disconnects the line or impulse relay A of the group selector, at the same time extending the line conductors to the next successive switch over the contacts 35*p*/36*p* and line wipers *a* and *b* of the group selector GW.

The operation of the rotary stepping magnet D is stopped by the opening of the contact 47*p*.

The call from the station N1 is in this manner extended over the authorized trunk I.

However, if the party at station N1 from which calls are authorized only over the trunks I should have dialled one of the digits 8, 9 or 0, respectively designating the trunks II, III and IV, the test circuit "10" cannot be completed because contacts 36*b* and 31k1–7 are open. The wipers of the group selector are in such case rotated to an overrun position 11 in which is closed the rotary off-normal contact 49*w*11 for energizing the relay M over its winding I in the circuit:

(12) From +, 49*w*11, winding I of M, 21*a* and 50*c* to —.

Busy tone BZ is now connected to the winding III of the relay A over contact 51*m* of the energized relay M and such busy tone is inductively transmitted to the windings I and II of the line relay A for transmission to the calling station. The connection is released upon replacement of the receiver by the party at the calling station.

2. *Calls from stations authorized to extend calls only by way of trunks I and III*

In order to identify a station authorized to extend calls only by way of trunks I and III, positive potential is continuously placed on the authorization marker conductor of the seized group selector. Only the wiper *z* of the preselector VW3 of such a station has been shown in the drawing. The positive potential will be continuously connected to the wiper *z* by way of the interconnected terminals 1/2, responsive to the actuation of contact 52*t*3 of the corresponding cut-off relay, and is thus extended to the marker conductor when the associated preselector VW3 connects with an idle group selector which is assumed to be the group selector switch GW.

Upon seizure of the group selector GW by the preselector VW3, relay B will be energized prior to the switching over of the contacts *c* by the relay C, in the circuit:

(13) From +, terminal 1/2, 52*t*3, wiper *z* of the preselector VW3, 18*p*, 19*c*, 20*b*, winding I of B, 21*a* to —.

Relay B will remain actuated over the circuit "4" traced before. The testing circuit of the group selector GW is interrupted at contact 36*b*. The group selector operates as already described. If the party at the calling station associated with the preselector VW3 has dialed one of the digits 1–7 for extending a call over the authorized trunks I, the test circuit for the test relay P will be completed over the vertical off-normal contact 31k1–7 upon seizure of an idle trunk by the group selector, in the corresponding level, thus extending the call in the desired authorized traffic direction I.

However, if the calling party associated with the preselector VW3 should have dialed the digit 8 which identifies the unauthorized trunk II, the vertical off-normal contact 31k1–7 will be opened upon completion of the corresponding vertical stepping of the group selector to the eighth level, and since the relay B is at that time energized and its contact 36*b* open, the test circuit over relay P cannot be completed and the group selector continues to rotate in such level to the overrun position 11 in which is opened the rotary off-normal or overrun contact 23*w*11 interrupting the holding circuit for the relay B. Over the rotary off-normal contact 49*w*11, the circuit "12" traced before is closed to cause energization of the relay M over its winding I and consequent transmission of the busy tone to the calling station in the manner already described. Relay M also opens its contact 37*m* to stop rotation of the selector wipers as explained before.

If the party calling over the preselector VW3 dials the digit 9 identifying the authorized trunk III, the vertical off-normal contact 53k9/0 will be closed responsive to vertical operation of the group selector GW to the respective vertical level 9, and the positive potential which is in this case for the duration of the call on the marker conductor will accordingly be connected to the opposing winding III of the relay B over the closed vertical off-normal contact 53*k*9/0 and contact 54*b*, the circuit being:

(14) From +, terminals 1/2, 52*t*3, wiper *z* of the preselector VW3, 18*p*, 53*k*9/0, 54*b*, winding III of B, 21*a* and 50*c* to —.

The current now flowing in the opposing winding III of relay B causes such relay to restore. At contact 24*b* is interrupted the holding circuit "4" for the relay B and at contact 54*b* is interrupted the circuit "14" for the opposing winding III of the relay B. Upon deenergizing, relay B restores its contact 36*b*, preparing the testing circuit for the relay P and the group selector switch can accordingly operate to select an idle trunk in the authorized traffic direction III.

If the calling station should dial digit 0 designating unauthorized extension of the call over the trunk IV, relay M will be energized from +, contact 52*t*3, wiper *z* of preselector VW3, 18*p*, vertical off-normal contact 55*k*0 which is closed in level 0, winding I of M, 50*c* to —. Upon energizing, relay M connects busy tone at its contact 51*m* and opens contact 37*m* to stop rotation of the selector wipers. The release of the partly built up unauthorized call is effected as explained before.

3. *Calls from stations authorized to extend calls only in traffic directions I, II and III*

As a criterion for identifying a station authorized to extend calls by way of the trunks I, II and III but barred from extending calls over trunks IV, positive potential is connected to *z* wiper of the preselector VW4 of such station at the instant when the group selector GW seized by the preselector is ready to receive the direction-identifying dial impulse series. Only the wiper *z* of the corresponding preselector VW4 is shown in the drawing. The positive potential is connected to the wiper *z* over the contacts 55*r*4 and 56*t*4 of the associated line and cut-off relays only after deenergization of the line relay of the calling station corresponding in function to the line relay R1 associated with the preselector VW1. The relay C is at that instant energized and contact 19*c* is accordingly open. The circuit for relay B, winding I, by way of contacts 55*r*4, 56*t*4, wiper *z*, and contacts 18*p* and 19*c* of the marker conductor therefore cannot be completed and relay B remains normal.

Responsive to dialed digits 1–7 for the trunks I, or digit 8 for the trunk II or digit 9 for the trunk III, the rotary stepping magnet D of the group selector GW will be operated and the testing circuit for the test relay P will be completed upon seizure of an idle trunk in the corresponding levels as already described. Calls over these authorized trunks are accordingly extended.

However, if the calling party at the station associated with the preselector VW4 should dial the digit 0 for the unauthorized trunk IV, relay M will be energized, over the vertical off-normal contact 55*k*0 which is at the corresponding level closed, in a circuit:

(15) From +, 55*r*4, terminals 3/4, 56*t*4, wiper *z* of preselector VW4, 18*p*, 55*k*0, winding I of M, 21*a* and 50*c* to —.

Upon energizing, relay M opens its contact 37*m*, thus opening the circuit of the rotary stepping magnet D. The group selector GW is in this manner prevented from hunting in the 10th level of its contact bank. The relay M by closing its contact 51*m* causes transmission of the busy tone to the calling party in the manner already described.

4. *Calls from stations authorized to extend calls only by way of trunks I and II*

In order to identify a station authorized to extend calls only by way of the trunks I and II, negative potential is connected to the authorization marker conductor. In the illustrated example, such a station is associated with a preselector VW2 which is adapted to seize an idle group selector such as GW. Only the control wiper *z* of such preselector VW2 is shown in the drawing. The relay B is prevented from energizing when the group selector is seized because negative potential is at that time connected to both terminals of its winding I.

Assuming that the calling party at the corresponding station dials one of the digits 1–7 for the trunks I or the digit 8 for the trunk II, the testing circuit for the test relay P of the group selector GW can be completed over the vertical off-normal contact 31*k*1–7 or over the normal contact 36*b*, respectively. However, if the digit 9 for the trunk III is dialed, or the digit 0 for the trunk IV, a circuit will be completed over the vertical off-normal contact 53*k*9/0, for the energization of relay B, winding II, extending:

(16) From —, terminals 9/0, 57*t*2, wiper *z* of preselector VW2, 18*p*, vertical off-normal contact 53*k*9/0, 58*b*, winding II of B to +.

The holding circuit "4" for relay B winding I is now established as already described. At contact 58*b*, the original energizing circuit for winding II of relay B is interrupted. Upon energization, relay B also opens its contact 36*b*. The group selector GW rotates its wiper in the levels 9 and 0 (traffic directions III and IV) which are unauthorized for the calling party, to the overrun position 11, because contacts 31*k*1–7 and 36*b* are open and the relay M is accordingly energized in the circuit "12."

Busy tone will accordingly be transmitted to the calling party as described before. The extension of the call by way of the unauthorized trunks III and IV is in this manner prevented.

5. *Calls from stations authorized to extend calls only by way of trunks I, III and IV*

A station authorized to extend calls by way of the trunks I, III and IV, but barred from extending calls by way of the trunk II, is identified by positive potential directly connected to the marker conductor over contact 51*r*5 of the associated line relay in the energized position thereof and having in the normal position of the line relay positive potential connected thereto over a resistor W5. In the illustrated example, such station is assumed to be associated with a preselector VW5 which is adapted to extend calls to group selectors such as the group selector GW.

Upon seizure of the group selector GW, by the preselector VW5, the relay B will be energized after the associated cut-off relay (which controls the contact 60*t*5) and the associated line relay (which controls the contacts *r*5/51*r*5) are in actuated position while the relay C is still normal, relay B being energized over its winding I in the circuit:

(17) From +, 51$r$5, interconnected terminals 5/6, 60$t$5, wiper $z$ of the preselector VW5, 18$p$, 19$c$, 20$b$, winding I of B, 21$a$ to —.

Relay B energizes and completes a holding circuit for itself traced before under "4."

If the calling party dials one of the digits 1–7 (authorized trunks I) the wipers of the group selector GW will be stepped vertically to the corresponding level and thereafter will rotate within such level, and if an idle trunk is found, the testing circuit will be completed over the closed vertical off-normal contact 31$k$1–7.

In case the calling party dials the digit 8 (unauthorized trunk II), the testing circuit for the relay P cannot be completed because contacts 31$k$1–7 and 36$b$ are open. The group selector therefore rotates to the overrun position 11 in which the relay M is energized (circuit "12") to cause transmission of the busy tone as described before.

If the calling party dials the digit 9 or 0 (authorized trunks III and IV), the opposing winding III of relay B will be energized over the circuit including the vertical off-normal contact 53$k$9/0 (closed in levels 9 and 0):

(18) From +, resistor W5, interconnected terminals 7/8, 60$t$5, wiper $z$ of the preselector VW5, 18$p$, 53$k$9/0, 54$b$, opposing winding III of B, 21$a$ and 50$c$ to —.

The winding I of the relay M is in the vertical level 0 likewise connected to the marker conductor over the contact 55$k$0, but does not receive sufficient current over the resistor W5 and consequently remains at normal.

The energization of the opposing winding III of relay B causes such relay to restore, closing contact 36$b$ and the testing circuit is accordingly operative for authorized trunks III and IV extending from the group selector levels 9 and 0.

*6. Calls from stations with unlimited call privileges*

A station authorized to extend calls involving any one of the traffic directions I–IV is identified by the absence of potential on the authorization criteria marker conductor. Such a station is assumed to be associated with the preselector VW6 of which only the wiper $z$ is shown in the drawing. It will be seen that none of the terminals 1/2–9/0 are interconnected and no potential will accordingly be connected to the corresponding preselector wiper $z$ over the contact 61$t$6 of the associated cut-off relay, for connection to the marker conductor of the group selector GW when such group selector is seized by the corresponding preselector. Accordingly, the relays B and M will remain at normal. The group selector can therefore hunt in all levels 1–0. The test circuit for relay P will extend in the levels 1–7 over vertical off-normal contact 31$k$1–7 in parallel with contact 36$b$ and in levels 8, 9, 0 over contact 36$b$.

Changes may be made within the scope and spirit of the appended claims.

We claim:

1. In an automatic private branch exchange telephone system having a plurality of stations respectively authorized to extend calls involving one or more different classes of services, preselectors respectively individual to said stations for extending calls therefrom, a selector switch accessible to said preselectors, said selector switch being operative to control the further extensions of said calls, a circuit arrangement for ascertaining the respective authorization of calling stations to extend calls involving predetermined classes of service, said circuit arrangement comprising switching means in said selector switch for controlling the operation thereof in further extending calls responsive to series of impulses respectively received from calling staations and identifying the desired class of service, a current source for supplying a station-authorization marking potential which is identical for a plurality of stations with different call-authorization, means for connecting said authorization marking potential to said selector switch at a predetermined instant directly following the seizure thereof by the preselector of a calling station to control the actuation of said switching means, and means governed by said switching means responsive to connection of said authorization potential for preventing said selector switch to extend calls involving classes of service which are unauthorized for the respectively calling stations.

2. A system and cooperation of parts as defined in claim 1, comprising a line relay for each of said stations, and means controlled by the line relay of a calling station in the actuated position thereof for connecting said authorization marking potential temporarily to said selector switch directly upon seizure thereof by the corresponding preselector.

3. A system and cooperation of parts as defined in claim 1, comprising a line relay for each of said stations, and means controlled by the line relay of a calling station in normal position thereof for connecting said authorization potential to said selector switch at the instant when said selector switch is ready to receive said series of impulses from such calling station.

4. A system and cooperation of parts according to claim 1, wherein said authorization potential is connected to said selector switch after seizure thereof by the preselector of a calling station at the instant directly preceding receipt of the series of impulses from said calling station.

5. A system and cooperation of parts according to claim 1, comprising means for connecting said authorization potential to said selector switch for the duration of the seizure thereof by the preselector of a calling station.

6. A system and cooperation of parts according to claim 1, wherein said authorization potential is connected to said selector switch temporarily at the instant directly following the seizure thereof by the preselector of a calling station, comprising a control relay forming part of said switching means, means for actuating said control relay responsive to connection of said authorization potential regardless of the class of service involved in the extension of the corresponding call, a test circuit in said selector switch, and means governed by said control relay for interrupting said test circuit to inhibit extension of the corresponding call involving a predetermined unauthorized class of service.

7. A system and cooperation of parts according to claim 1, wherein said authorization potential is connected to said selector switch for the duration of seizure thereof by the preselector of a calling station, comprising a control relay forming part of said switching means, means for actuating said control relay responsive to connection of said authorization potential regardless of the class of service involved in the extension of the corresponding call, a test circuit in said selector switch, and means governed by said control relay for interrupting said test circuit to inhibit extension of the corresponding call when such call involves an unauthorized class of service.

8. A system and cooperation of parts according to claim 1, comprising a control relay forming part of said switching means, means for actuating said control relay responsive to connection of said authorization potential, a test circuit in said selector switch, and means governed by said control relay for interrupting said test circuit to inhibit extension of the corresponding call when such call involves any one of a plurality of predetermined unauthorized classes of service.

9. A system and cooperation of parts according to claim 1, comprising a control relay forming part of said switching means, means for actuating said control relay responsive to connection of said authorization potential, a test circuit in said selector switch, means governed by said control relay for interrupting said test circuit to inhibit extension of the corresponding call when said call involves any one of a plurality of predetermined unauthorized classes of service, and means responsive to actuation of said selector switch to extend a call involving another predetermined authorized class of service for restoring said control relay so as to effect restoration of said test circuit for the purpose of permitting extension of the corresponding call involving the authorized class of service.

10. A system and cooperation of parts according to claim 1, wherein said authorization potential is connected to said selector switch for the duration of seizure thereof by the preselector of a calling station, comprising a control relay forming part of said switching means, means for actuating said control relay responsive to connection of said authorization potential, a test circuit in said selector switch, means governed by said control relay for interrupting said test circuit to inhibit extension of the corresponding call when such call involves any one of a plurality of predetermined unauthorized classes of service, and means responsive to actuation of said selector switch to extend a call involving another predetermined authorized class of service for restoring said control relay under control of said authorization potential so as to effect restoration of said test circuit for the purpose of permitting extension of the corresponding call involving the authorized class of service.

11. A system and cooperation of parts according to claim 1, wherein said authorization potential is connected to said selector switch for the duration of seizure thereof by the preselector of a calling station, comprising a first control relay forming part of said selector switch, means for actuating said first control relay responsive to connection of said authorization potential, a test circuit in said selector switch, means governed by said first control relay for interrupting said test circuit to inhibit extension of the corresponding call when such call involves any one of a plurality of predetermined unauthorized classes of service, means responsive to actuation of said selector switch to extend a call involving another predetermined authorized class of service for restoring said control relay under control of said authorization potential so as to effect restoration of said test circuit for the purpose of permitting extension of the corresponding call involving the authorized class of service, a second control relay, means for actuating said second control relay responsive to operation of said selector switch to extend a call involving a further predetermined unauthorized class of service, and means governed by said second control relay for preventing extension of said call involving said further unauthorized class of service.

12. A system and cooperation of parts according to claim 1, wherein said authorization potential is connected to said selector switch for the duration of seizure thereof by the preselector of a calling station, comprising a first control relay forming part of said selector, means for actuating said first control relay responsive to connection of said authorization potential, a test circuit in said selecor switch, said test circuit extending over a wiper of said selector switch, a rotary magnet and a circuit therefor for rotating said wipers to extend a call to an idle one of a plurality of trunks accessible to said wiper, means governed by said first control relay for interrupting said test circuit to inhibit extension of the corresponding call when such call involves any one of a plurality of predetermined unauthorized classes of service, means responsive to actuation of said selector switch to extend a call involving another predetermined authorized class of service for restoring said control relay under control of said authorization potential so as to effect restoration of said test circuit for the purpose of permitting extension of the corresponding call involving the authorized class of service, a second control relay, means for actuating said second control relay responsive to operation of said selector switch to extend a call involving a further predetermined unauthorized class of service, and means governed by said second control relay for interrupting the circuit of said rotary magnet to stop rotation of said wipers so as to prevent extension of the corresponding call involving said further unauthorized class of service.

13. A system and cooperation of parts according to claim 1, comprising a first control relay for inhibiting extension of a call involving a first predetermined unauthorized class of service, and a second control relay for inhibiting the extension of said call involving a second predetermined unauthorized class of service.

14. A system and cooperation of parts according to claim 1, comprising means for connecting said authorization potential to said selector switch over a resistor after seizure thereof by the preselector of a calling station, a control relay forming part of said switching means, circuit means for actuating said control relay to prevent extension of the corresponding call involving a predetermined unauthorizd class of service, and circuit means governed by said potential connected over said resistor for causing said control relay to restore so as to permit extension of the corresponding call involving another predetermined authorized class of service.

15. A system and cooperation of parts according to claim 1, comprising means for connecting said authorization potential to said selector over a resistor after seizure thereof by the preselector of a calling station, a control relay forming part of said switching means, said control relay having two opposing windings, circuit means for actuating said control relay over one of said windings to prevent extension of the corresponding call involving a predetermined unauthorized class of service, and circuit means including said potential connected over said resistor for energizing the other opposing winding so as to cause said control relay to restore for the purpose of permitting extension of the corresponding call involving another predetermined authorized class of service.

16. A system and cooperation of parts according to claim 1, comprising means for connecting said authorization potential to said selector solely responsive to seizure thereof by a preselector of a calling station which is restricted to extending calls involving at least one predetermined class of service.

17. A system and cooperation of parts according to claim 1, comprising wiper means forming part of the respective preselectors for connecting said authorization potential to said selector switch responsive to seizure thereof by a preselector of a calling station.

References Cited in the file of this patent

UNITED STATES PATENTS

| | | |
|---|---|---|
| 2,333,474 | Denton | Nov. 2, 1943 |
| 2,544,944 | Wicks | Mar. 15, 1951 |
| 2,686,840 | Den Hertog | Aug. 17, 1954 |
| 2,707,727 | Pharis | May 3, 1955 |
| 2,773,939 | Trousdale | Dec. 11, 1956 |

FOREIGN PATENTS

| | | |
|---|---|---|
| 670,062 | Great Britain | Apr. 16, 1952 |